US008856792B2

(12) United States Patent
Michailov et al.

(10) Patent No.: US 8,856,792 B2
(45) Date of Patent: Oct. 7, 2014

(54) CANCELABLE AND FAULTABLE DATAFLOW NODES

(75) Inventors: Zlatko V. Michailov, Redmond, WA (US); Niklas Gustafsson, Redmond, WA (US); Daniela Cristina Manu, Sammamish, WA (US); Stephen H. Toub, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/972,039

(22) Filed: Dec. 17, 2010

(65) Prior Publication Data

US 2012/0159512 A1   Jun. 21, 2012

(51) Int. Cl.
*G06F 9/46* (2006.01)
*G06F 9/44* (2006.01)
*G06F 9/54* (2006.01)

(52) U.S. Cl.
CPC ............... *G06F 9/542* (2013.01); *G06F 9/466* (2013.01); *G06F 9/546* (2013.01)
USPC ............................ 718/101; 719/313; 719/314

(58) Field of Classification Search
CPC .......... G06F 9/542; G06F 9/466; G06F 9/546
USPC .................................. 718/101; 719/313, 314
See application file for complete search history.

(56) References Cited

U.S. PATENT DOCUMENTS

| | | | |
|---|---|---|---|
| 5,428,732 A * | 6/1995 | Hancock et al. | ............... 715/201 |
| 5,864,849 A | 1/1999 | Bohannon et al. | |
| 6,272,672 B1 | 8/2001 | Conway | |
| 6,757,695 B1 | 6/2004 | Noveck et al. | |
| 7,103,593 B2 | 9/2006 | Dean | |
| 7,155,444 B2 | 12/2006 | Krishnan et al. | |
| 7,194,483 B1 | 3/2007 | Mohan et al. | |
| 7,328,316 B2 | 2/2008 | Moir et al. | |
| 7,373,504 B1 * | 5/2008 | Belgaied et al. | ............... 713/164 |
| 7,614,029 B2 | 11/2009 | Manohar | |
| 7,634,760 B1 | 12/2009 | Gomtow et al. | |
| 7,779,201 B1 | 8/2010 | Agarwal et al. | |
| 7,958,167 B2 * | 6/2011 | Diaconu et al. | ............... 707/821 |
| 2002/0157016 A1 | 10/2002 | Russell et al. | |
| 2002/0188697 A1 | 12/2002 | O'Connor | |
| 2003/0144892 A1 | 7/2003 | Cowan et al. | |

(Continued)

OTHER PUBLICATIONS

Toub, "Parallelizing Operations With Dependencies," MSDN Magazine, Apr. 2009, http://msdn.microsoft.com/en-us/magazine/dd569760.aspx.

(Continued)

*Primary Examiner* — Camquy Truong
(74) *Attorney, Agent, or Firm* — Kevin Sullivan; Alin Corie; Micky Minhas

(57) ABSTRACT

One embodiment includes a method of performing dataflow processing. The method includes representing a first asynchronous processing node as a first future. The first future represents the lifecycle of processing of the first asynchronous processing node. The method further includes representing one or more other asynchronous operations as one or more other futures. The one or more other futures represent the asynchronous completion of one or more operations' processing. The first future and the one or more other futures are represented as a single composite future. The single composite future represents completion of processing of the combination of the first asynchronous processing node and the one or more other asynchronous operations.

20 Claims, 2 Drawing Sheets

(56) References Cited

U.S. PATENT DOCUMENTS

| | | |
|---|---|---|
| 2005/0091287 A1 | 4/2005 | Sedlar |
| 2005/0114290 A1 | 5/2005 | Borthakur et al. |
| 2006/0047636 A1 | 3/2006 | Mohania et al. |
| 2006/0047713 A1 | 3/2006 | Gornshtein et al. |
| 2006/0129745 A1 | 6/2006 | Thiel et al. |
| 2007/0061487 A1 | 3/2007 | Moore et al. |
| 2007/0100823 A1 | 5/2007 | Inmon |
| 2007/0156966 A1 | 7/2007 | Sundarrajan et al. |
| 2007/0174360 A1 | 7/2007 | Yagawa |
| 2007/0185934 A1 | 8/2007 | Cannon et al. |
| 2007/0219976 A1 | 9/2007 | Muralidhar et al. |
| 2008/0043760 A1 | 2/2008 | Venkatraman et al. |
| 2008/0043761 A1 | 2/2008 | Kumar et al. |
| 2008/0065443 A1 | 3/2008 | Gorur et al. |
| 2008/0082984 A1 | 4/2008 | McDaniel |
| 2008/0222152 A1 | 9/2008 | Godbole |
| 2009/0006494 A1 | 1/2009 | Hong et al. |
| 2009/0037763 A1 | 2/2009 | Adhya et al. |
| 2009/0064157 A1 | 3/2009 | Bar-Or |
| 2009/0199285 A1 | 8/2009 | Agarwal et al. |
| 2009/0300591 A1 | 12/2009 | Duffy |

OTHER PUBLICATIONS

Callahan, "Design Considerations for Parallel Programming," MSDN Magazine, Oct. 2008, http://msdn.microsoft.com/en-us/magazine/cc872852.aspx.

Graeme Malcom. Managing Unstructured Data with SQL Server 2008. SQL Server Technical Article, Published: Aug. 2007, Applies to SQL: Server 2008. download.microsoft.com/download/a/c/d/acd8e046-d69b-4f09-bc9e-4168b65aaa71/SQL2008UnstructuredData. Doc. Accessed Nov. 7, 2007, 11 pages.

Eric Chu, et al. A Relational Approach to Incrementally Extracting and Querying Structure in Unstructured Data. VLDB '07, Sep. 23-28, 2007, Vienna, Austria. VLBD Endowment, ACM 978-1-59593-649 Mar. 7, 2009. pages.cs.wisc.edu/~ericc/VLDB2007.pdf, 12 pages.

Michael Vizard, et al. IBM: Xperanto Rollout to Start in Early 2003. From the Jan. 3, 2003 Issue of CRN www.crn.com/it-channel/18838697, 2 pages.

Mark Smith. Informatica Powers Up Data Integration, Apr. 17, 2007. businessintellegence.com/ex/asp/id.233/xe/biresearchdetail.htm, 3 pages.

U.S. Appl. No. 12/042,571, Jul. 29, 2010, Office Action.

U.S. Appl. No. 12/042,571, Oct. 26, 2010, Notice of Allowance.

* cited by examiner

CANCELABLE AND FAULTABLE DATAFLOW NODES

BACKGROUND

Background and Relevant Art

Computers and computing systems have affected nearly every aspect of modern living. Computers are generally involved in work, recreation, healthcare, transportation, entertainment, household management, etc.

A dataflow network is a network of concurrently executing processes or automata executing on computing systems referred to as nodes that can communicate with each other by virtue of tree or graph edges connecting the nodes. Dataflow nodes in a dataflow network exist to process messages provided to them as input and/or output messages to other target nodes or receiving code.

In a composable system, it would be useful to treat these dataflow blocks themselves as asynchronous operations which could complete (1) successfully, (2) due to error, or (3) due to cancellation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method of performing dataflow processing. The method includes representing a first asynchronous processing node as a first future. The first future represents the lifecycle of processing of the first asynchronous processing node. The method further includes representing one or more other asynchronous operations as one or more other futures. The one or more other futures represent the asynchronous completion of one or more operations' processing. The first future and the one or more other futures are represented as a single composite future. The single composite future represents completion of processing of the combination of the first asynchronous processing node and the one or more other asynchronous processing operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments are directed to implementations in a dataflow network with asynchronous operations. Data operations may be of a synchronous type or asynchronous type. A synchronous operation is an operation in which the operation's completion signals the end of a message's processing. An asynchronous operation is an operation that asynchronously signals its completion to the caller. For example, an asynchronous operation is an operation that returns an object which represents the asynchronous completion of the operation. While dataflow systems provide support for dataflow blocks, these dataflow blocks may support processing only one message at a time, and they are limited to synchronous processing, meaning that the processing of a message is considered to start when a function to process that message is invoked and to complete when that function exits.

Some embodiments are directed to implementations in a dataflow network where asynchronous operations are represented as "futures". A future is a returnable object representing the asynchronous completion of a message's processing. In some embodiments, multiple futures can be composed together, and the composition itself represents a distinct future. For example, a compression and encryption function may be a distinct future. However the compression and encryption function may be composed of a compression future and an encryption future. In particular, a compression node may perform compression operations on some data and once compression operations have been performed, an encryption node may perform encryption functions on the compressed data. The compression node may be able to signal to the encryption node through a specialized interface when all data has been compressed and sent to the encryption node. The encryption node can then know what data needs to be encrypted to represent a complete compression and encryption operation, such that once that data has been encrypted, the encryption node can return a completion message representing a compression and encryption future.

Figure 1:
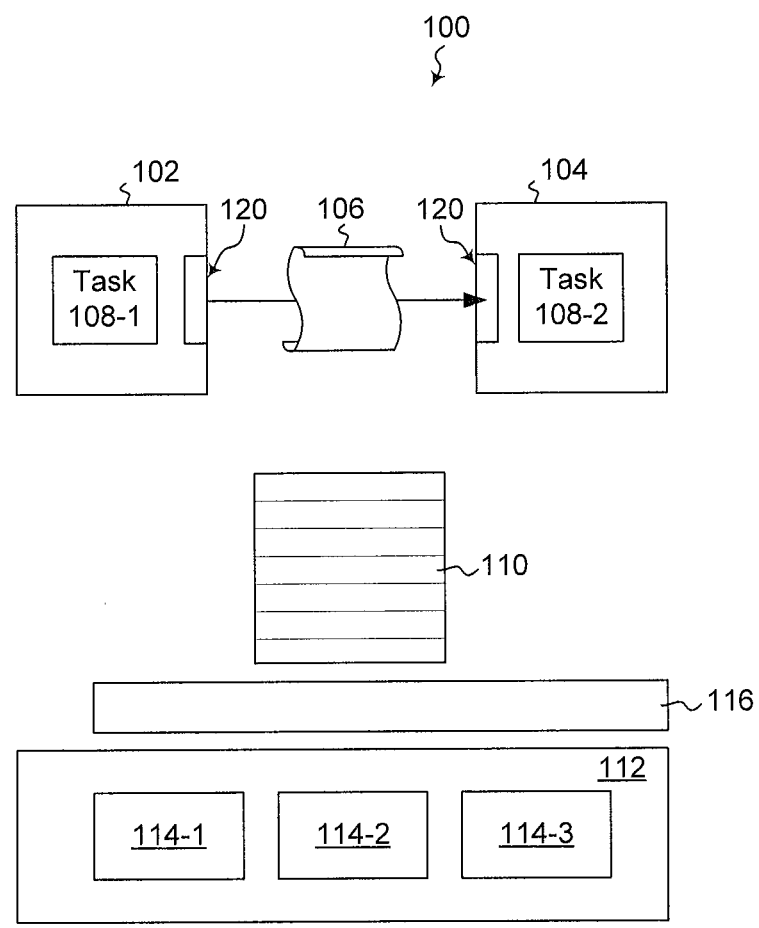
FIG. 1 illustrates a dataflow system.

Various features of some embodiments will be illustrated below. For example, some embodiments illustrate a concept of representing/encapsulating a dataflow node and all of its processing as a single asynchronous operation, and using a future as that representation. Some embodiments illustrate enabling the cancellation of a dataflow node in a dataflow network by providing to it a cancellation token it may monitor for a cancellation request, and ending the dataflow node process in the canceled state if the node is canceled. Some embodiments illustrate tracking any unhandled errors that occur during processing, ending further processing early if any errors occur, and using those errors to end the node/completion future in a faulted state with those errors as the cause. Some embodiments illustrate composition of dataflow nodes as part of larger asynchronous operations through use of a future as the common asynchronous representation Referring now to FIG. 1, an example is illustrated. FIG. 1 illustrates a simple dataflow system 100. The dataflow system 100 includes a data source node 102 and a target node 104. The data source node 102 sends a message 106 to the target node 104 for processing. The target node can accept and process multiple messages 106. While in this simple example, messages 106 are sent from the data source node 102 to a target node 104, it should be appreciated that the dataflow network may include many nodes, each of which performs some function on data provided to it from a source node. For example, the target node 104 may be a source node for another node downstream from the target node 104. Additionally, as illustrated below, the source node 102 and target node 104 may be part of a process flow of a message where the combination of the functions of both the source node 102 and the target node 104 can be represented as a single distinct future.

A data flow node may execute futures, such as is illustrated at 108-1 and 108-2. To perform the actual execution of these futures, the futures may be queued in a queue 110 used to feed a thread set 112. The thread set represents the threads, referred to generally as 114, but illustrated specifically as 114-1, 114-2, and 114-3, which can be used to perform the futures 108. For example, an example asynchronous future may be a download future. The asynchronous download future 108 may include requesting that some data be downloaded from an external source. A thread 114 is used by the asynchronous future 108 to make the download request and is then freed to be used by another future, or other system component that draws on the same thread set 112, while the data downloads. Once the data has downloaded, the asynchronous future may request use of a thread 114 to perform further processing.

The threads 114 illustrated herein may take any one of a number of different forms. For example, each thread may be the single thread included as part of a single processor core in a multi-core system. In particular, a processor core may have a single arithmetic logic unit (ALU) and a single set of thread registers which are comprised of the single thread. Alternatively, each thread may be one thread from among a plurality of threads of a single processor. For example, a core may have a single ALU, but multiple sets of thread registers, such that multiple threads are implemented using a single core. Alternatively, virtual threads may be implemented where an operating system or other software manages virtual threads and schedules the virtual to execute on underlying hardware processors or hardware threads. Futures 108 can be assigned from the queue 110 to threads using the scheduler 116.

Embodiments may implement, in a composable system, functionality for treating dataflow nodes themselves as asynchronous operations which could complete successfully. Some operations may complete (1) successfully, (2) due to error, or (3) due to cancellation. Some embodiments may accomplish this through the representation of a dataflow node as a future, as described above. Some embodiments have an implementation where a future is represented by a Task from the .NET 4 Framework available from Microsoft Corporation of Redmond Wash. For any dataflow node, a System.Threading.Tasks.Task may be retrieved which represents all of the processing performed by that node, including the node's completion due to failure and cancellation. Dataflow nodes in one embodiment solution implement IDataflowBlock, which exposes a CompletionTask property that returns a System.Threading.Tasks.Task instance. Task is a type introduced in the .NET Framework 4 to represent arbitrary asynchronous operations.

Returning once again to a more general example, a target node 104 may be notified that it will receive no more messages 106 to be processed, at which point once it has processed all messages 106 it may complete the future 108-2. A source node 102 may have internal knowledge of when it will produce no more messages, at which point it may complete the future 108-1.

A dataflow node that does processing may receive one or more unhandled errors during that processing, and those errors will eventually cause early termination of the node with the errors exposed from the completion future. Similarly, a node may have its processing canceled, which would result in termination and the completion future ending as canceled.

Dataflow nodes in some embodiments implement a specialized interface 120, which exposes a completion future member that returns a future. In the .NET 4 example, dataflow nodes may implement the IDataflowBlock, which exposes a. CompletionTask member that returns a Task which represents the future. Generally, the future is a singular representation of the lifetime of the dataflow node, and completes in a final state of RanToCompletion, Faulted, or Canceled when and only when all of the node's processing has completed. The first two states are direct corollaries to a synchronous invocation of a function either running to completion or causing an error such as throwing an error out of the function. The third state may potentially be triggered by input, such as a specific kind of error that indicates the operation was canceled, or it may be achieved through directly informing the future that the operation was canceled. The definition of completed is in part left up to the node itself, but at its core, completion means that the node will do no further active processing. And except for nodes with specialty behavior (such as a node that stores a single value and gives copies of that value indefinitely to anyone who asks for data from the node), nodes do not complete until all of their data has been consumed. Thus, for example, code can register to receive a notification when a completion future completes, and at that point the receiver of the notification will know for sure that the node has completed all processing, will not attempt to output any further messages, etc.

Target dataflow nodes may be notified that they should accept no more messages via a decline permanently method that may be implemented on the specialized interface 120. Once this method has been called, a node knows that as soon as it is finished processing all of the previously received input messages, it will have no more work to do. In the .NET 4 example, target dataflow nodes may be those implementing the ITargetBlock<TInput> interface.

Similarly, nodes may have internal knowledge of when they will produce no more data and when all previously produced data has been consumed by linked targets or other consumers of the source. In the .NET 4 example, these may be nodes implementing the ISourceBlock<TOutput> interface.

And nodes that are both a target and a source again know when they are declining all further messages, have completed processing previously received inputs, and/or have propagated outward all values. At that point, a dataflow node may complete in the RanToCompletion state.

Using this functionality, two or more nodes may be composed together as a single node with a single future. In particular, a source node 102 can inform a target node 104 that no further messages are being sent. Additionally, the target node 104 knows when it has finished processing its messages. Thus, a target node 104 can return a future that represents a future for the composition of nodes 102 and 104 when the target node 104 knows that no further messages are coming from the source node 102 and that the target node 104 has processed all of its messages associated with a composite operation such as the compression and encryption operation described above.

During a dataflow node's processing, user-code provided to the node and used to process messages may throw unhandled errors. Additionally, as the node communicates with other sources and targets, those other nodes may be faulty and may throw unhandled errors back to the node through the specialized interface 120. These unhandled errors cause the node to end in a faulted state, meaning that its completion future will complete in the faulted state and where the future's error contains as inner errors the one or more errors, from the various nodes, that went unhandled. When an error goes unhandled, the node optionally ceases to do any further processing beyond any currently outstanding operations. If the node does choose to prevent further operations from starting, once all operations have completed it gathers up all of the unhandled errors and uses them to complete the completion future. A node may have multiple variations on this behavior. For example, a node may choose not to process any more incoming messages, but choose not to complete until all output generated from already processed messages prior to the error(s) occurring have been consumed.

Some nodes may expose additional mechanisms for inputting errors. For example, a buffer node may expose a post error method which accepts one or more errors and which causes the buffer node to fault with those errors as if they had occurred inherent to the node's processing. This enables a more compositional model, such that data and errors from one node may be copied to another. In the .NET 4 example, a BufferBlock<T> may expose a PostError method which accepts one or more exceptions and which causes the buffer node to fault with those exceptions as if they had occurred inherent to the node's processing.

Dataflow nodes may be configured with a myriad of options, one of which is a cancellation token. For example, in .NET 4 Framework, a CancellationToken is used to monitor for a cancellation request. A cancellation request can be observed by, for example, polling a Boolean, registering a callback, and/or waiting on a synchronization primitive until cancellation is requested. Upon receiving a cancellation token, the dataflow node registers to be notified that cancellation has been requested, and upon notification it signals to itself that no more messages should be received or produced. When the node then attempts to shut itself down, it does so by completing its completion future in the canceled state, so that all observing code may see that the node likely completed its processing prematurely due to a cancellation request. In some embodiments, if the dataflow node received any errors during processing, those errors trump a cancellation request, such that even if cancellation was requested, the node will end in a faulted state.

Some unhandled errors may also be special-cased. For example, if an operation canceled error goes unhandled during a message's processing, a node may choose to treat that as cancellation of the individual message, in effect ignoring both the error and the message's processing, rather than either faulting or canceling the node.

With a future that now represents the entire asynchronous processing of a dataflow node, that future may be used with all means of composing together multiple futures. For example, embodiments can asynchronously wait for multiple nodes to complete. The following illustrates pseudo code using an await function which waits for an argument future to be completed. The WhenAll function returns a future which completes when all of the futures provided as arguments complete.
  await Future.WhenAll (dataflowBlock1.CompletionFuture, dataflowBlock2.CompletionFuture);

In alternative embodiments, embodiments can asynchronously wait for the first node to complete with code such as:
  await Future.WhenAny (dataflowBlock1.CompletionFuture, dataflowBlock2.CompletionFuture).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
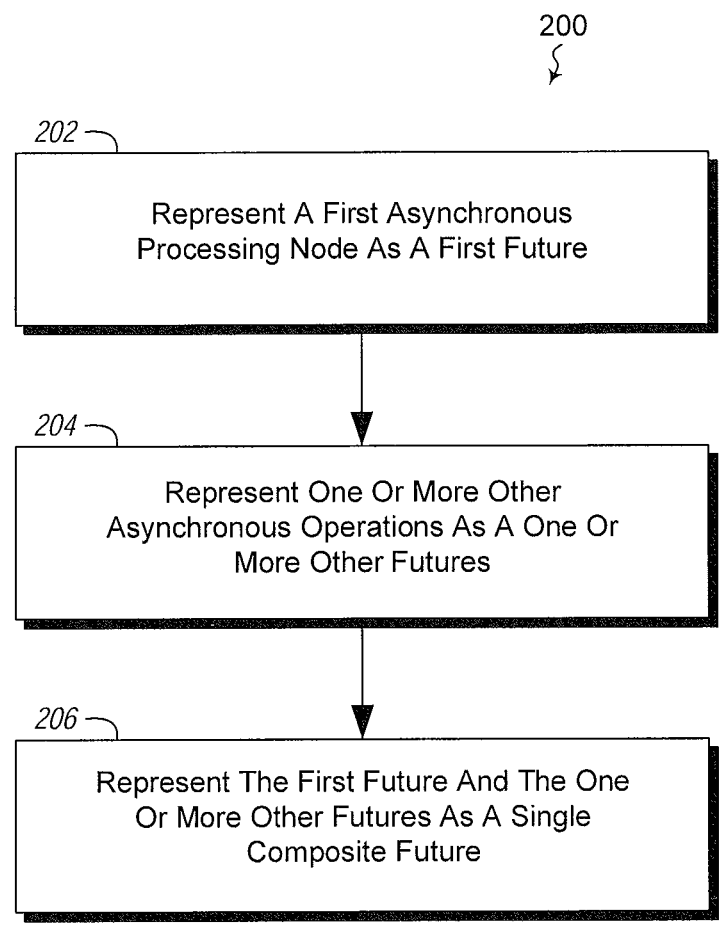
FIG. 2 illustrates a method of dataflow processing.

FIG. 2 illustrates a method 200 of performing dataflow processing. The method 200 includes representing a first asynchronous processing node as a first future (act 202). The first future represents the lifecycle of processing of the first asynchronous processing node. This lifecycle may be based, for example, on completing (1) successfully, (2) due to error, or (3) due to cancellation.

The method 200 further includes representing one or more other asynchronous operations as a one or more other futures (act 204). The one or more other futures represent the asynchronous completion of one or more operations' processing. This may be based, for example, on completing (1) successfully, (2) due to error, or (3) due to cancellation. Note that these asynchronous operations may be representative of asynchronous processing nodes in a dataflow network, or may be some other asynchronous operation. For example, as illustrated above, an encryption processing node may be used with a compression processing node and represented by a distinct future. These processing nodes may be further combined with an asynchronous download operation, which is not an asynchronous node in the dataflow network, and represented together as a distinct future.

The method 200 further includes representing the first future and the one or more other futures as a single composite future (act 206). The single composite future represents completion of processing of the combination of the first asynchronous processing node and the one or more other asynchronous operations.

As noted above, the method 200 may be practiced where the lifecycle of processing includes completing processing data. Alternatively, the method 200 may be practiced where the lifecycle of processing includes aborting processing data. In yet another alternative, the method 200 may be practiced where the lifecycle of processing includes ending processing data due to an error.

Embodiments of the method 200 may include tracking errors indicated by a previous node in a dataflow system. Ending processing data due to an error may be based on tracked errors and error handling policy in one of the nodes or a composite node. For example, as messages flow through nodes, errors may be accumulated through the various nodes. Ending processing does not necessarily occur in the node where the error occurred, but may cause a subsequent node to end processing for all nodes represented by a composite future.

The method 200 may be practiced where the lifecycle of processing includes ending processing data due to a cancellation indicator.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. Notwithstanding this definition of "network", this definition is not necessarily limiting or applicable for a "dataflow network" described above. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform futures. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing dataflow processing the method comprising:
    representing a first asynchronous processing node as a first future, the first future being a returnable object representing the end of a lifecycle of processing of the first asynchronous processing node;
    representing one or more other asynchronous nodes as a one or more other futures, the one or more other futures being returnable objects representing the asynchronous completion of one or more nodes' processing;
    at the first node, determining that processing has completed at the one or more other asynchronous nodes;
    at the first node, determining that processing has completed at the first node; and
    as a result of the first node determining that processing has completed at the one or more other asynchronous nodes and the processing has completed at the first node, the first node providing a single composite future that represents the first future and the one or more other futures as a single composite future, the single composite future being a single returnable object representing completion of processing of the combination of the first asynchronous processing node and the one or more other asynchronous nodes.

2. The method of claim 1, wherein the lifecycle of processing comprises completing processing data.

3. The method of claim 1, wherein the lifecycle of processing comprises aborting processing data.

4. The method of claim 1, wherein the lifecycle of processing comprises ending processing data due to an error.

5. The method of claim 4, further comprising tracking errors indicated by a previous node in a dataflow system, and wherein ending processing data due to an error is based on tracked errors and error handling policy in one of the nodes or a composite node.

6. The method of claim 4, further comprising tracking errors indicated by a previous node in a dataflow system, and as a result, not processing any more incoming messages, but does not return the composite future indicating processing is complete until all already processed messages prior to the error occurring have been consumed.

7. The method of claim 1, wherein the lifecycle of processing comprises ending processing data due to a cancellation indicator.

8. A physical computer readable storage medium comprising computer executable instructions that when executed by one or more processors cause one or more computer processors to perform the following:

representing a first asynchronous processing node as a first future, the first future being a returnable object representing the end of a lifecycle of processing of the first asynchronous processing node;

representing one or more other asynchronous nodes as a one or more other futures, the one or more other futures being returnable objects representing the asynchronous completion of one or more nodes' processing;

at the first node, determining that processing has completed at the one or more other asynchronous nodes;

at the first node, determining that processing has completed at the first node; and as a result of the first node determining that processing has completed at the one or more other asynchronous nodes and the processing has completed at the first node, the first node providing a single composite future that represents the first future and the one or more other futures as a single composite future, the single composite future being a single returnable object representing completion of processing of the combination of the first asynchronous processing node and the one or more other asynchronous nodes.

9. The computer readable medium of claim 8, wherein the lifecycle of processing comprises completing processing data.

10. The computer readable medium of claim 8, wherein the lifecycle of processing comprises aborting processing data.

11. The computer readable medium of claim 8, wherein the lifecycle of processing comprises ending processing data due to an error.

12. The computer readable medium of claim 11, further comprising tracking errors indicated by a previous node in a dataflow system, and wherein ending processing data due to an error is based on tracked errors and error handling policy in one of the nodes or a composite node.

13. The computer readable medium of claim 11, further comprising tracking errors indicated by a previous node in a dataflow system, and as a result, not processing any more incoming messages, but does not return the composite future indicating complete until all already processed messages prior to the error occurring have been consumed.

14. The computer readable medium of claim 8, wherein the lifecycle of processing comprises ending processing data due to a cancellation indicator.

15. The computing system of claim 14, wherein the lifecycle of processing comprises completing processing data.

16. The computing system of claim 14, wherein the lifecycle of processing comprises ending processing data due to an error.

17. The computing system of claim 16, further comprising tracking errors indicated by a previous node in a dataflow system, and wherein ending processing data due to an error is based on tracked errors and error handling policy in one of the nodes or a composite node.

18. The computing system of claim 16, further comprising tracking errors indicated by a previous node in a dataflow system, and as a result, not processing any more incoming messages, but does not return the composite future indicating processing is complete until all already processed messages prior to the error occurring have been consumed.

19. The computing system of claim 14, wherein the lifecycle of processing comprises ending processing data due to a cancellation indicator.

20. A computing system for performing dataflow processing the computing system comprising:

a first asynchronous computer processing node comprising a specialized interface for indicating a first future, the first future being a returnable object representing the end of a lifecycle of processing of the first asynchronous processing node;

one or more other asynchronous computer processing nodes comprising the specialized interface for indicating one or more other futures, the one or more other futures being returnable objects representing the lifecycle of processing of the one or more other asynchronous processing nodes;

the specialized interface configured to determine that processing has completed at the one or more other asynchronous nodes;

the specialized interface configured to determine that processing has completed at the first node; and the specialized interface configured, as a result of determining that processing has completed at the one or more other asynchronous nodes and the processing has completed at the first node; to represent the first future and the one or more other futures as a single composite future, the single composite future being a returnable object representing completion of processing of the combination of the first asynchronous processing node and the one or more other asynchronous processing nodes.

* * * * *